(12) United States Patent
Simpson (10) Patent No.: US 6,171,558 B1
(45) Date of Patent: Jan. 9, 2001

(54) CHLORINE DIOXIDE GENERATOR

(76) Inventor: Gregory D. Simpson, 131 Center Ct., Deer Park, TX (US) 77536

( * ) Notice: Under 35 U.S.C. 154(b), the term of this patent shall be extended for 0 days.

(21) Appl. No.: 09/338,951

(22) Filed: Jun. 24, 1999

(51) Int. Cl.[7] .................................................. B01J 19/12
(52) U.S. Cl. ............................................................ 422/186.3
(58) Field of Search .................... 204/157.44, 157.48, 204/157.5; 422/186.3, 62, 234; 423/177

(56) References Cited

U.S. PATENT DOCUMENTS

| | | | |
|---|---|---|---|
| 4,311,485 | * | 1/1982 | Saltzman et al. ........................ 422/62 |
| 4,414,180 | * | 11/1983 | Fisher ...................... 422/186 |
| 4,456,511 | | 6/1984 | Fisher . |
| 4,874,489 | * | 10/1989 | Callerame ...................... 204/157.44 |
| 4,877,500 | | 10/1989 | Callerme . |
| 5,458,858 | * | 10/1995 | Dawkins ................ 422/234 |
| 6,042,802 | * | 3/2000 | Drake ................................... 423/477 |

* cited by examiner

Primary Examiner—Kathryn Gorgos
Assistant Examiner—Thao Tran
(74) Attorney, Agent, or Firm—Leonard Bloom (57) ABSTRACT

A generator for continuously creating chlorine dioxide. A lamp is positioned in a container holding aqueous chlorite, and the aqueous chlorite is circulated through a circulation tube. A shield reduces contact between the lamp radiation and the aqueous chlorite outside of the circulation tube. The aqueous chlorite in the circulation tube is irradiated by the lamp to generate chlorine dioxide. The chlorine dioxide can be removed from the container with an vacuum eductor or can be transported with a gas sparge. Continuous production of the chlorine dioxide can be monitored and controlled with a control module which detects the quantity of chlorine dioxide generated. The generator reduces safety hazards associated with the handling of chlorite solutions and provides an inexpensive, portable system for the in situ generation of chlorine dioxide.

19 Claims, 7 Drawing Sheets

EXPERIMENTAL DESIGN
Effect of Air Sparge, Annular Space

| Factor | −1 | 0 | +1 |
|---|---|---|---|
| Annular Space (dia of PVC Tube | 1 5/16 | 1 1/2 | 2.0 |
| Air Sparge (SCFH) | 5 | 10 | 15 |

CHLORINE DIOXIDE GENERATOR

BACKGROUND OF THE INVENTION

The present invention relates to the in situ generation of chlorine dioxide. More particularly, the invention relates to a portable chlorine dioxide generator engagable with a container of aqueous chlorite to generate chlorine dioxide, and to the method of generating chlorine dioxide from the aqueous chlorite.

Chlorine dioxide is used in numerous commercial and industrial applications. Chlorine dioxide provides a microbiological control agent in the dairy industry, the beverage industry, and in the processing of poultry, beef, and other food products. Chlorine dioxide is used as a bleaching agent for paper pulp and other chemical applications. Chlorine dioxide is also used in potable water treatment facilities, in industrial cooling systems, and in the oil and gas industry. Chlorine dioxide is increasingly used in industrial waste treatment facilities because of its selectivity towards environmentally objectional materials such as phenols, sulfides, cyanides, thiosulfates and mercaptans. Chlorine dioxide has rapid disinfection kinetics, is non-reactive with ammonia and most organics, and is effective over a wide pH range.

Chlorine dioxide has been traditionally produced by several chemical processes. For large applications requiring tons of production per day, chlorine dioxide was created with chlorate as the base reactant. For smaller applications requiring less than several tons of chlorine dioxide, sodium chlorite is typically reacted with aqueous chlorine supplied by gaseous chlorination or from the reaction of sodium hypochlorite with hydrochloric acid. Chlorine dioxide is also formed by the reaction of chlorite with acid.

Chemical generation of chlorine dioxide is formed in a special reactor referred to as a "generator". Commercial chlorine dioxide generators are constructed with PVC or other plastics and mix the reactants with positive displacement pumps or with vacuum creating eductors. At least two chemicals are required in the conventional production of chlorine dioxide, and the cost of the generators precludes the economic application of chlorine dioxide to small applications.

Another known technology uses electrolytic processes to generate chlorine dioxide from an aqueous solution of sodium chlorite or sodium chloride. This technology is not widely used due to the size or cost of the generators and the resulting production of explosive hydrogen gas.

The photochemical creation of chlorine dioxide from aqueous chlorite has been reported in the literature for many years. In 1961, Buxton and Williams reported their studies regarding the photochemical decomposition of aqueous solutions of oxyanions of chlorine and chlorine dioxide. In 1962, Kujirai and Fujita reported that ultraviolet (UV) light generated chlorine dioxide, that the rate of chlorite decomposition decreased with increasing wavelength, and that virtually no chlorine dioxide was produced by wavelengths greater than 300 nm.

Other work has been published in the field of chlorine dioxide generation. U.S. Pat. No. 4,414,180 to Fisher (1983) disclosed a central reaction tube containing chlorite solution. The container was bombarded with radiation from externally placed incandescent or fluorescent lamps to create chlorine dioxide. Similarly, U.S. Pat. No. 4,456,511 to Fisher (1984) disclosed a corresponding method for generating chlorine dioxide gas by illuminating the chlorite solution batch and by discharging the aqueous phase chlorine dioxide into the gaseous phase.

U.S. Pat. No. 4,874,489 to Callerame (1989) disclosed a test chamber for generating a batch of chlorine dioxide by subjecting chlorite to ultraviolet radiation. A "shiny reflector" was positioned at the outside of the chamber to concentrate the radiation emitted by the ultraviolet radiation source, and the ultraviolet radiation was discontinued for safety reasons when the chlorine dioxide concentration within the batch chamber reached ten percent by weight. The lamps simultaneously irradiated all of the sodium chlorite solution within each batch and retained the produced chlorine dioxide gas within the chamber. Afterwards, the entire reaction product containing up to ten percent chlorine dioxide was removed from the reaction space.

Chlorine dioxide and certain reactants for the formation of chlorine dioxide have caused accidents and injuries. Sodium chlorite powder is a very strong oxidizer that can flash or explode when contacted with an oxidizable substance such as an organic or cellulose based material. Accidents have occurred in the storage and handling of sodium chlorite, such as when sodium chlorite solution is poured from one container to another, and when dilution pumps do not properly dilute the reactants to safe concentrations. Spills and leaking pumps can permit the evaporation of the solution and the resultant accumulation of chlorite crystals which are ignitable when contacted with organic and cellulose materials.

Because chlorine dioxide can explode when the concentration exceeds a certain level, chlorine dioxide generators should avoid the undesirable accumulation of chlorine dioxide in gas or liquid form. Such generators should avoid the risks associated with transporting and mixing the hazardous reactants used in the formation of chlorine dioxide. Accordingly, a need exists for an improved apparatus and method for producing chlorine dioxide in a safe and economical manner.

SUMMARY OF THE INVENTION

The present invention provides a chlorine dioxide generator for use with a container holding aqueous chlorite. The apparatus includes a lamp for generating radiation, a connector or cap attached to the lamp so that the lamp is positioned within the container, a circulation tube proximate to the light for circulating the aqueous chlorite in contact with the lamp radiation to create chlorine dioxide, and a discharge port in communication with the chlorine dioxide for permitting the withdrawal of the chlorine dioxide from the container. In an embodiment of this invention, there can be disposed a gas sparge line, an aspirator and discharge port.

In other embodiments of the invention, a shield or shroud is positioned proximate and external to the circulation tube to impede contact between the lamp radiation and aqueous chlorite outside of the circulation tube. A control module can detect certain conditions within the container and can modify the production of the chlorine dioxide.

A method of the invention is practiced by positioning a lamp in a container holding aqueous chlorite, circulating aqueous chlorite through a circulation tube proximate to the lamp to generate chlorine dioxide, shielding the aqueous chlorite outside of the circulation tube from contact with the lamp radiation, and withdrawing the chlorine dioxide from the container.

DESCRIPTION OF THE PREFERRED EMBODIMENTS

Figure 1:
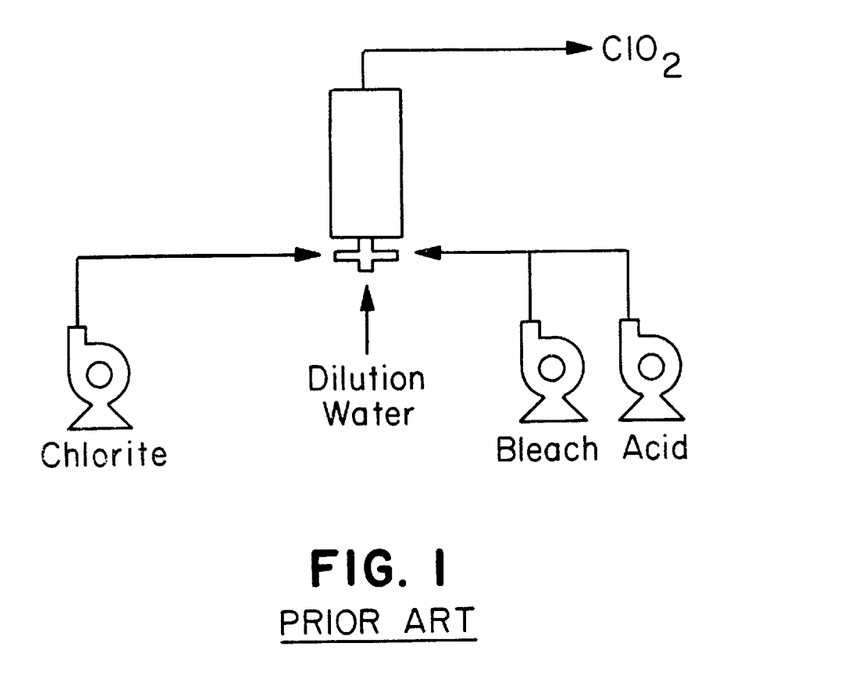
FIG. 1 illustrates a schematic diagram for conventional pump based systems for generating chlorine dioxide as used in the prior art.
Figure 2:
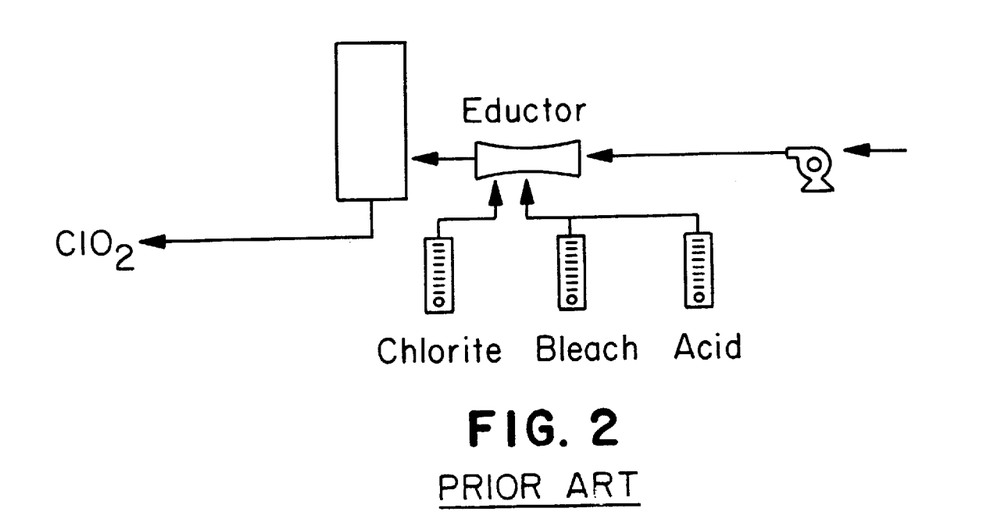
FIG. 2 illustrates a schematic diagram for conventional eductor based systems for generating chlorine dioxide as used in the prior art.

The present invention furnishes a unique generator for producing chlorine dioxide from an aqueous chlorite solution. FIG. 1 illustrates a schematic diagram showing the prior art conventional production of chlorine dioxide with positive displacement pumps. FIG. 2 illustrates a schematic diagram showing the prior art convention production of chlorine dioxide with an eductor. As illustrated, conventional prior art chemical processes for the generating of chlorine dioxide require the mixing of different reactants.

Figure 3:
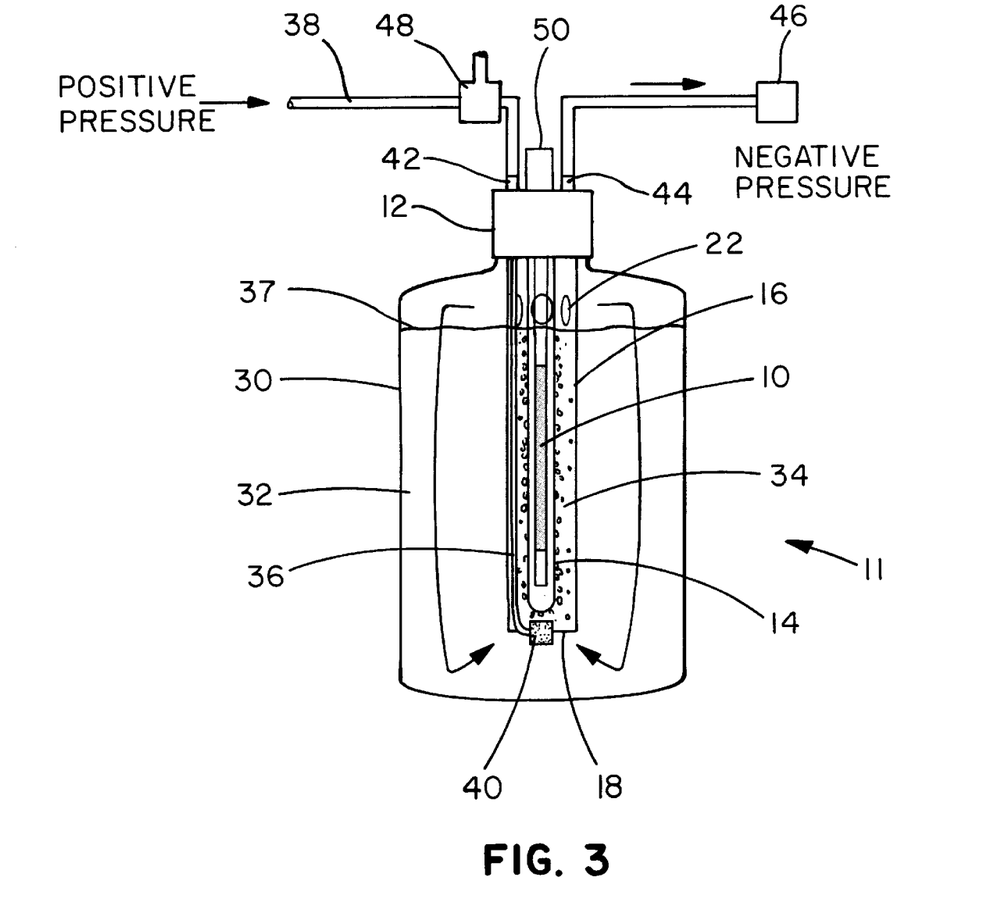
FIG. 3 illustrates the completely assembled chlorine dioxide generator of this invention.

FIG. 3 illustrates the completely assembled chlorine dioxide generator 11 of the invention. Engaged with container 30 holding aqueous sodium chlorite 32 is a circulation tube 16 and ultraviolet lamp 10. The concentration of sodium chlorite solution 32 preferably ranges between 1% and 37%. As shown in FIG. 3, sodium chlorite solution 32 circulates through circulation tube 16 through annulus 18 and apertures 22. U.V. lamp 10 and quartz tube or housing 14 are internal of circulation tube 16. When lamp 10 emits radiation to contact sodium chlorite in solution 32 in circulation tube 16, microbubbles of generated chlorine dioxide are formed on the outer surface of the quartz tube 14. This is brought about by the reaction of U.V. light on chlorite to produce chlorine dioxide. Such microbubbles typically form near or on the quartz tube 14 surrounding lamp 10 because the transmission of the radiation emitted by lamp 10 diminishes exponentially through the aqueous sodium chlorite 32 as the radiation is absorbed by aqueous sodium chlorite solution 32. The cap 12 can be made to fit container 30 by means of threads, by a press fit or other means as readily understood by those skilled in the art.

Gas sparge line 36 is attached to intake port 42 and aspirator 40. Compressed air or an inert gas such as nitrogen can be pumped into supply or gas sparge line 36 through intake port 42, to gas sparge line 36 to aspirator 40. As shown in FIG. 3, aspirator 40 can be constructed as a fused glass aspirator or the aspirator could be made of silica which releases finely divided gas bubbles to rise in the aqueous sodium chlorite 32 within circulation tube 16. The aspirator 40 can be attached to circulation tube 16 with a bolt, glue or like holding means. It is conceivable that the aspirator and circulation tube can be joined as an integral unit. The finely divided gas bubbles sweep the chlorine dioxide microbubbles of chlorine dioxide 34 upwardly from the exterior surface of quartz housing 14 through apertures 22 which are positioned above liquid line 37 and toward discharge port 44 and thence to the field of use. Such movement can be accelerated with a vacuum device such as eductor 46 or other vacuum device attached to discharge port 44.

In addition to the chlorine dioxide microbubble sweeping function provided by gas sparge line 36 through aspirator 40, the sparge gas bubbles also provide an upward force against generated chlorine dioxide within circulation tube 16. Such upward force continuously drives sodium chlorite solution 32 through annulus 18 into circulation tube 16, with the chlorine dioxide gas exiting aperture 22 in the circulation tube. Chlorine dioxide leaves aperture 22 to be drawn to discharge port 44 by vacuum created by eductor 46. Such circulation path provides a substantially uniform concentration of sodium chlorite 32 in circulation tube 16 through annulus 18, and further continuously moves the microbubbles of chlorine dioxide 34 within circulation tube 16 to reduce the residence time of the chlorine dioxide microbubbles within the circulation tube. This feature of the invention reduces the degradation of chlorine dioxide 34 microbubbles caused by prolonged exposure of such microbubbles to radiation from lamp 10. Additionally, this feature of the invention further prevents the undesirable and unsafe accumulation of chlorine dioxide gas within container 30.

By circulating sodium chlorite solution 32 through annulus 18 into the circulation tube 16 on a continuous basis, a substantially steady state flow can be established to generate a substantially steady discharge rate of chlorine dioxide. The principal variables in this process relate to the diminishing concentration of chlorite ions within container 30, and to the various factors relating to the profile of the circulation tube 16 vis-a-vis the quartz housing 14 and the microbubbles of chlorine dioxide 34 formed along the length and circumference of circulation tube 16.

In the preferred embodiment, the circulation tube is made of clear PVC tubing. Clear PVC tubing is preferred because when irradiated with ultra violet light, the PVC gives off a pleasing green color. On the other hand, the circulation tube can be made of any color.

In a preferred embodiment of the invention, the forces circulating sodium chlorite 32 within circulation tube 16 can be created by a combination of the positive displacement gas sparge forces and the vacuum created by eductor 46. These forces cooperate to sweep chlorine dioxide through apertures 22 toward discharge port 44, and ensure continuous movement of the chlorine dioxide gas 34 away from quartz housing 14. Other techniques could be used to circulate sodium chlorite 32 through circulation tube 16, including mechanical pumps, selective heating to create convection currents, and rotational procedures creating vortical flow and mass transfer.

Vacuum breaker 48 is positioned in combination with intake port 42 to provide a check valve between the gas sparge source (not shown) and container 30. If the gas sparge source is interrupted, vacuum breaker 48 will open and permit ambient air to be drawn into supply line 36 and through aspirator 40 to continue the gas sparge function.

Figures 6, 7:
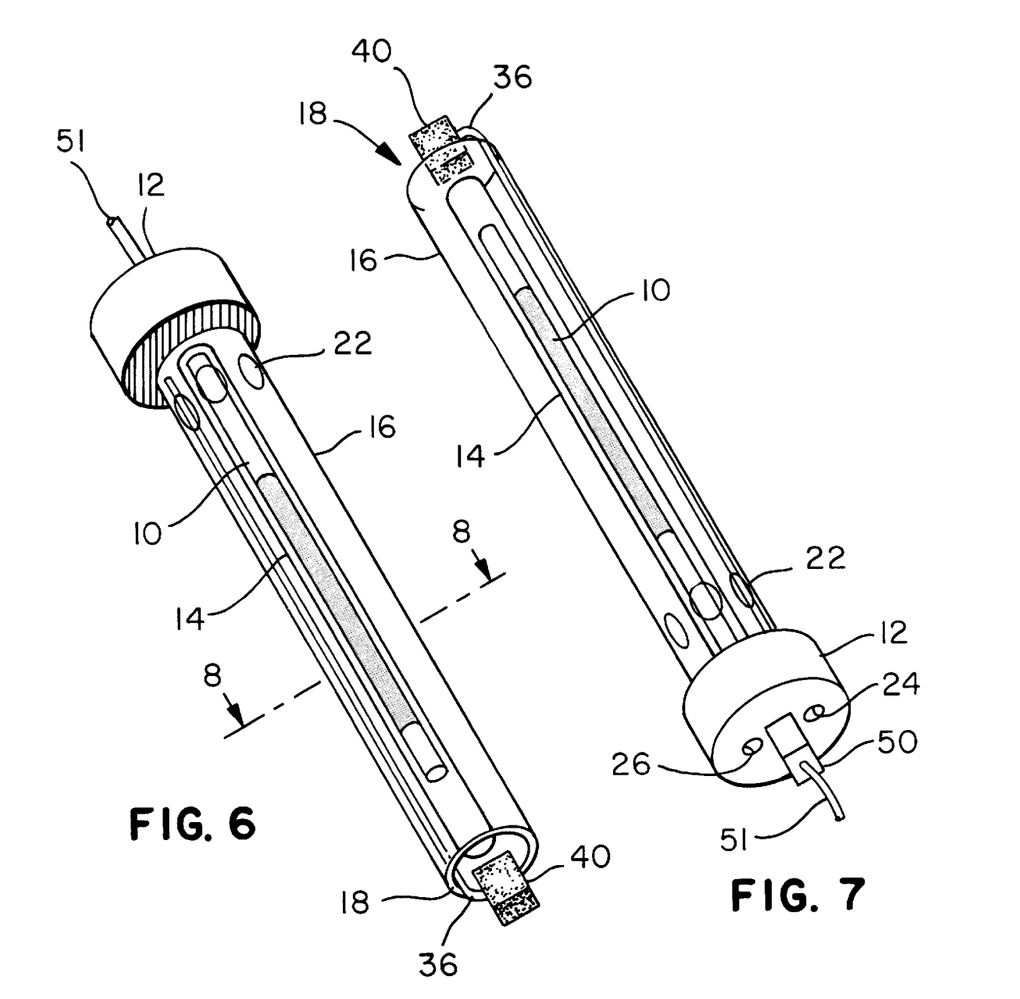
FIG. 6 is a perspective view of the cap with circulation tube surrounding the light and quartz housing viewed from the bottom.
FIG. 7 is a perspective view of the cap with circulation tube surrounding the light and quartz housing viewed from the top.

Controller 50 is attached to cap 12 for detecting and controlling different conditions and operations. Controller 50 can include a microprocessor that detects the production of chlorine dioxide 34. Moreover, controller 50 can selectively change the frequency or duration of the illumination provided by lamp 10, the frequency or duration of the gas sparge, and the number of illuminated lamps 10 in a multilamp system. Controller 50 can provide a control module to detect the quantity of chlorine dioxide produced, the presence of dangerous accumulations of chlorine dioxide, the concentration of chlorite ions in aqueous sodium chlorite 32, the temperature of the processes, the circulation of a gas sparge, and other variables in the system. Controller 50 can also provide a display for recording such variables and all adjustments generated by controller 50. In FIG. 7 the controller is shown attached to an electric cord 51 for power, however, the U.V. generator is able to function without a controller, that is, the generator connected directly to a power source.

Figure 4:
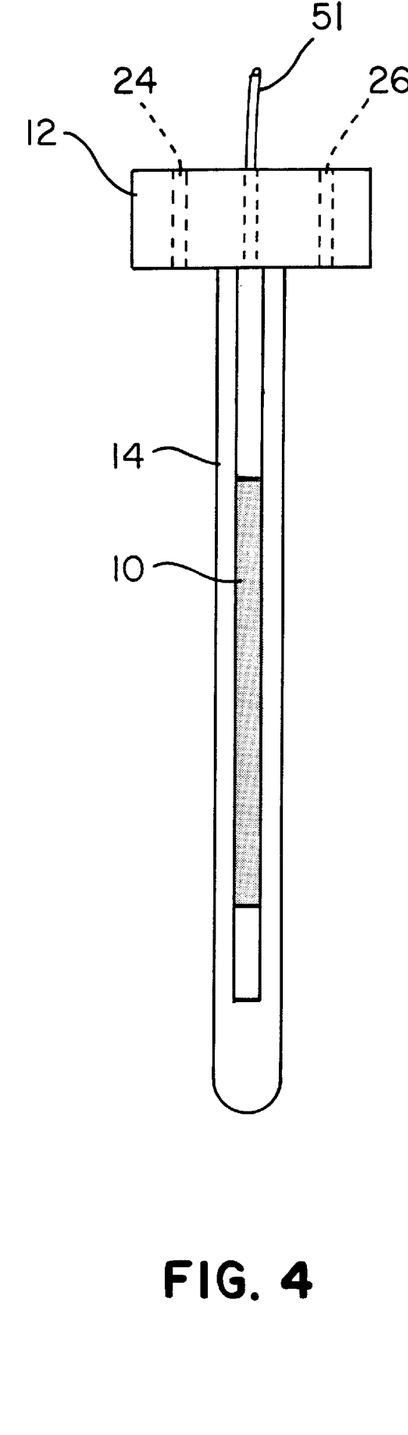
FIG. 4 illustrates a front plan view cap, lamp and quartz housing to be used in the chlorine generator.

The U.V. chlorine dioxide generator 11 provides a novel apparatus and method for generating chlorine dioxide. Various components making up the generator 11 are described in greater detail in FIGS. 4–9. FIG. 4 illustrates lamp 10 attached to connector or cap 12. Protective quartz housing 14 surrounds lamp 10 and prevents liquids or other materials from contacting the lamp. In an embodiment of the invention, lamp 10 comprises a low pressure mercury vapor type lamp which emits a strong radiation signal at 254 nm and a minimal output at wavelengths higher than 254 nm. This upper limit on the wavelength is preferred because high pressure lamps produce substantially greater output at higher wavelengths which promote the decomposition of chlorine dioxide. Housing 14 can be formed with an ultraviolet transmitting material other than quartz such as Suprasil or Vycor. As described in greater detail below, housing 14 protects lamp 10 and prevents contact between the lamp and the aqueous chlorite solution. In an alternative embodiment of the invention, multiple lamps 10 could be attached to cap 12 to increase the configuration or output of the radiation generated.

Figure 5:
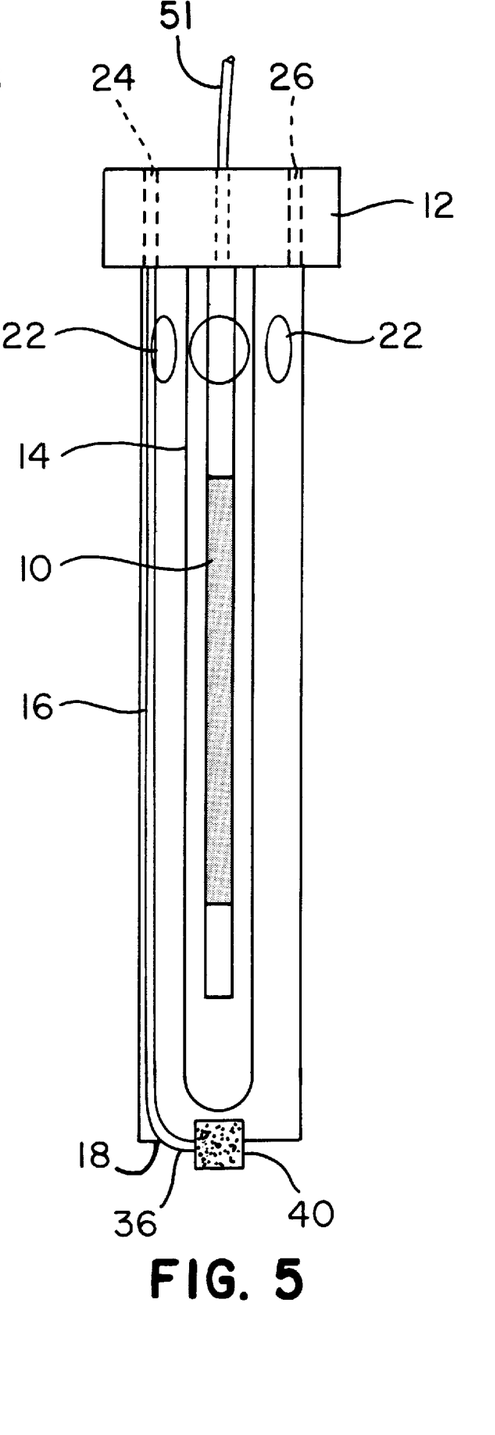
FIG. 5 illustrates a front plan view of the cap with circulation tube positioned surrounding the light and quartz housing.

With reference to FIGS. 4 and 5, there is shown in dashed lines 24 the entry where the gas sparge line 36 passes through cap 12 and dashed lines 26 showing the exit where the discharge port passes therethrough. Instead of passing directly through cap 12, the cap could be disposed with nipples for receiving tubing entering and exiting the cap.

With reference to FIGS. 5–8 a circulation tube 16 is attached to cap 12 and surrounds the U.V. lamp and quartz housing or tube. In the embodiment of the invention as shown, quartz housing 14 is substantially cylindrical, and circulation tube 16 is substantially shaped as a cylinder and is coaxial with lamp 10 and quartz housing 14. Annulus 18 is located at the bottom end of circulation tube 16 and defines a space through which chlorite solution enters to be contacted by U.V. light. Apertures 22 are positioned above the liquid line 37 at the upper end of tube 16, and annulus 18 is positioned at the lower end of tube 16. Annulas 18 and apertures 22 permit the circulation of a fluid through the circulation tube 16.

The herein disclosed invention contemplates as an alternative embodiment multiple circulation tubes positioned adjacent to a lamp 10. Each circulation tube would have a lower annulus and upper apertures to permit the circulation of fluid therethrough.

With reference to FIG. 7, there is shown in the top of the cap 12 orifice 24 through which the gas sparge line 36 passes and orifice 26 for the discharge port 44.

Figure 8:
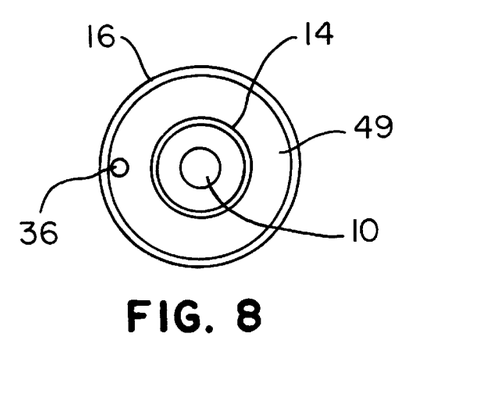
FIG. 8 is a cross sectional view of FIG. 7 taken along the plane of line 8—8.
Figure 10:
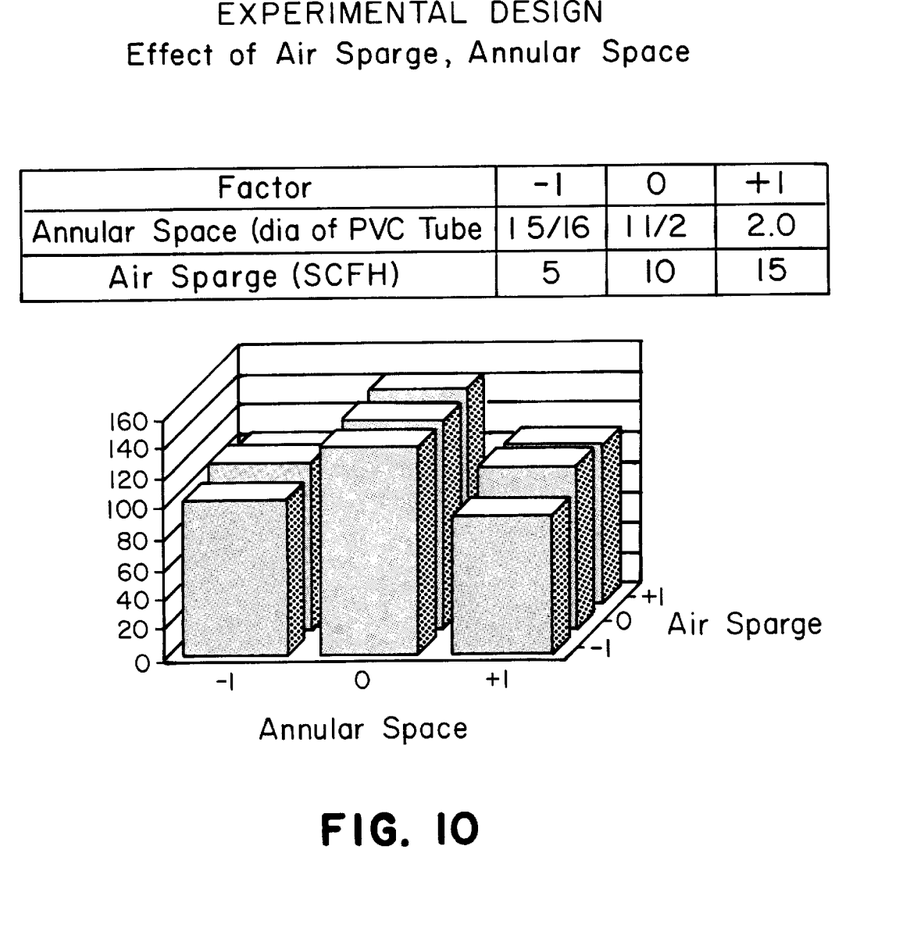
FIG. 10 is a graph showing the effect of air sparge and annular space between the circulation tube and the U.V. quartz housing on chlorine dioxide generation.
Figure 11:
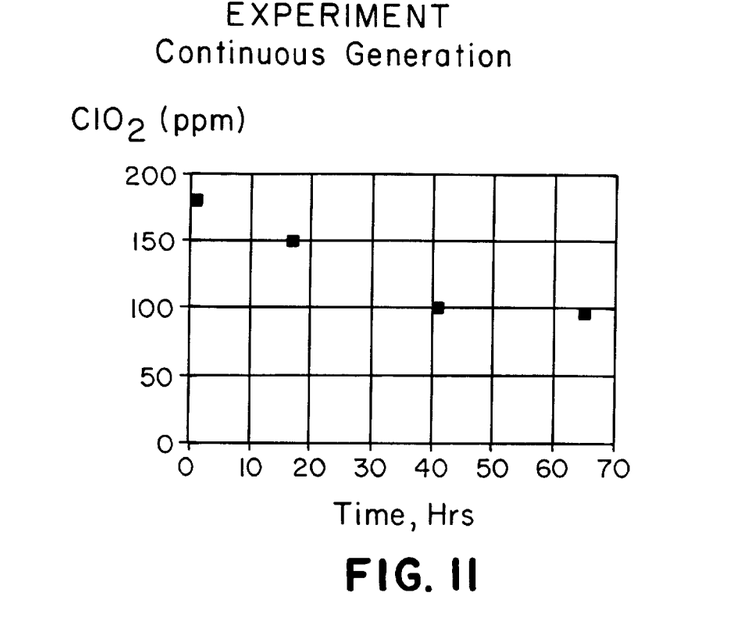
FIG. 11 is a graph showing the generation curve of chlorine dioxide with no circulation tube in place.
Figure 12:
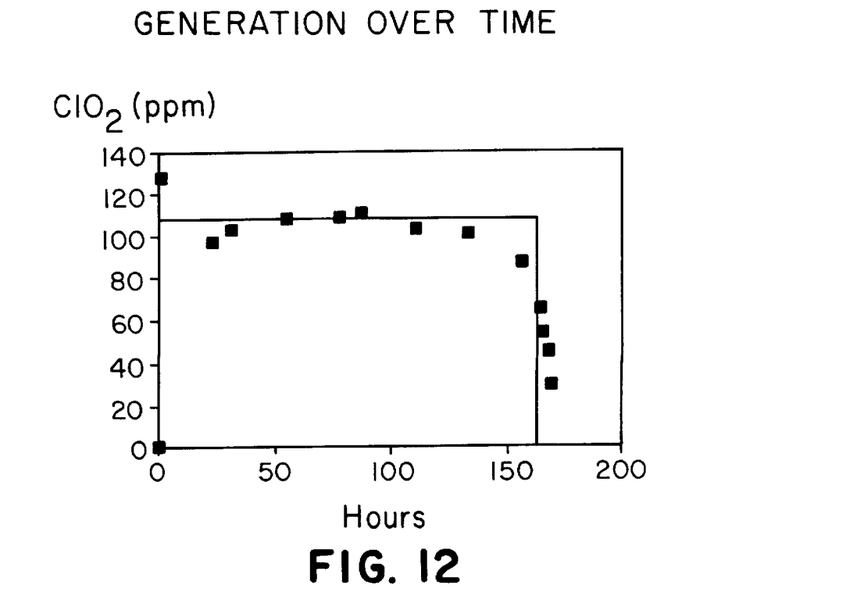
FIG. 12 is a graph showing the effect on chlorine dioxide generation with a circulation tube to direct air sparge.

Referring to FIG. 8, there is a cross-section taken along a plain 8—8 of FIG. 6 and describes the circumferential relationship between the circulation tube and the quartz housing. As presently defined, there is a critical distance relationship 49 between the quartz housing 14 and the circulation tube 16. The inventor has found that a quarter inch distance between the circulation tube 16 and the quartz housing 14 produces optimum results. The results involving optimum distance and optimum air sparge rate are shown in FIGS. 10–12.

Figure 9:
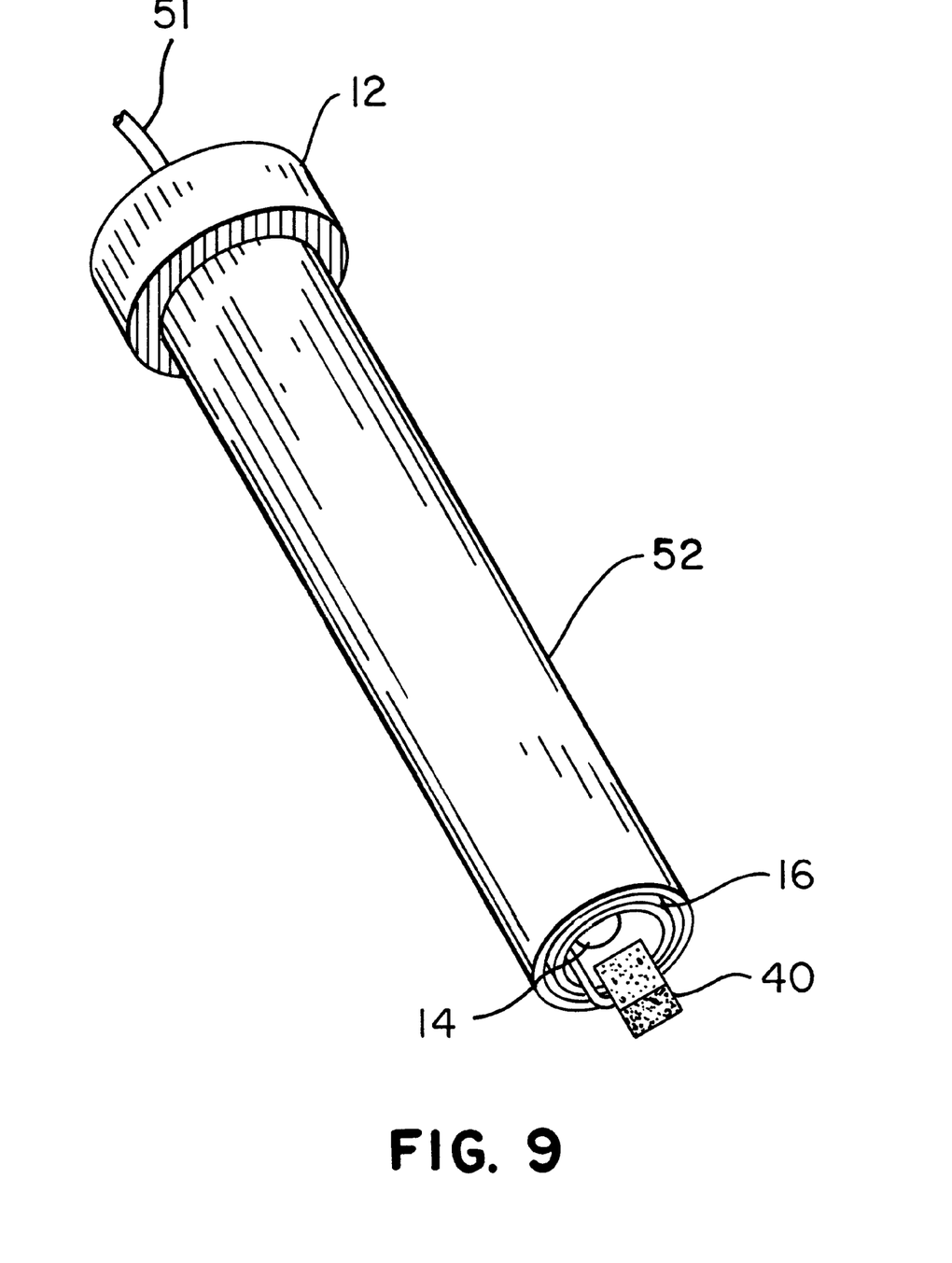
FIG. 9 is a perspective view of an alternative embodiment of the cap with circulation tube surrounding the light and quartz housing; and with a shroud surrounding the circulation tube.

With reference to FIG. 9, the cap 12 with circulation tube 16 surrounding the light and quartz housing has a shroud 52 surrounding the circulation tube 16. This shroud serves the purpose of preventing ultraviolet light passing beyond the circulation tube, if the tube is made of a transparent material. The benefit derived by the use of the shroud 52 is to prevent the conversion of chlorite to chlorine dioxide in an area extraneous to the inner portion of the circulation tube. The shroud or shield can be placed coaxially and outside of the circulation tube. This shield serves to block ultraviolet radiation to the chlorite solution in the areas beyond the circumference of the circulation tube. By blocking radiation, chlorine dioxide production within the circulation tube is maximized.

In an embodiment of the invention, shield 35 can be attached to or positioned proximate to circulation tube 16 to reduce contact between the radiation and aqueous sodium chlorite outside of circulation tube 16. This is done when the circulation tube is made of a clear material. In this embodiment, the sodium chlorite 32 is not contacted by radiation from lamp 10 until sodium chlorite 32 is circulated through annulus 18 of the circulation tube. Shield 35 surrounding circulation tube 16 formed with a material opaque to the transmission of the radiation from lamp 10.

In perfecting the herein disclosed invention, the inventor worked with a lamp which was 14 inches from tip to tip. The quartz tube or housing was 20 inches long. The circulation tube was 20 inches long and the filament of the U.V. lamp was 10 inches long. It is to be understood that these dimensions can vary, as can be readily determined by those skilled in the art.

An important consideration in the proper use of the device is that the filament of the lamp be under the chlorite solution level in the container. If the filament of the lamp is above the fluid level, there will be degradation of the chlorine dioxide gas, resulting in less than optimum delivery of chlorine dioxide gas.

The present invention uniquely provides a chlorine dioxide generator that does not require the introduction of chlorite during the operation of the system. After the aqueous chlorite solution is depleted, the ultraviolet portion of the generator can be removed and reinstalled in a new container of aqueous chlorite, or moved to another location. The portability of the system permits the establishment of an in situ chlorine dioxide generator immediately at the location of use. This portability and safety of application is ideally suited for small container uses such as hot tubs and is equally applicable to larger installations which require large quantities of chlorine dioxide such as bulk tanks and tote bins.

The design of the system can be readily adapted to different applications such as the changing of the number, intensity, and arrangement of lamps 10 and associated circulation tube. Lamp 10 can be substantially cylindrical or can be U-shaped so that all electrical connections exist on the upper end of lamp 10.

It is obvious that as an alternative embodiment of this invention that the cap could be so fashioned as to contain multiple lamps with circulation tubes.

The production of chlorine dioxide 34 can also be adjusted by modifying the internal gas sparge rate to ensure the removal of chlorine dioxide 34 and the recirculation of sodium chlorite 32 through annulus 18. The chlorine dioxide can be removed in gaseous or liquid phase depending on the desired use. All of the desired functions can be monitored and controlled with controller 50, and a permanent record of the chlorine dioxide production can be retained.

Chlorite absorbs strongly in the UV, having as its maximum absorbance about 260 nm or thereabouts. Chlorine dioxide has a minimum absorbance in the UV of about 254 nm. A low pressure lamp has a very small amount of mercury vapor inside the quartz envelope of the lamp. When a current is applied, the mercury vaporizes and emits a very strong line at 254 nm. Conventional UV lamps do not have a filament other than at the very end which serve to heat the mercury to form a mercury vapor arc.

It is well to understand that quartz is transparent to UV at 254 nm and above. Below 254 nm, which is also UV, a special kind of quartz is required to transmit the UV. Ultra-violet at 185 nm is used to destroy organics, create ozone, and is also useful for other very high energy activities. UV below 254 nm would be useful in practicing this invention.

The invention is not limited to low pressure ultraviolet lamps, as higher pressure lamps will also be operative, albeit less efficiently. The invention seeks to maximize the uv activation of chlorite to produce $ClO_2$ while minimizing the destruction of $ClO_2$ by UV. It is a known fact that UV light will destroy chlorine dioxide.

The invention will use the most highly powered low pressure lamp feasible. With higher pressure lamps, temperature problems are experienced, as higher pressure lamps put out excessive heat. This could be troublesome with chlorite crystallizing on the quartz tube, as crystallizing solid chlorite would be a safety concern. Using low pressure lamps or multiple lamps solves this problem. Mercury lamp output, or irradiance, is measured in microwatts of power at 1 meter. Testing of a number of these lamps showed a typical output of 77.5 microwatts at 1 meter with a standard deviation of about 4.6 microwatts.

In a specific embodiment, surrounding the UV lamp is a quartz tube, with diameter of ~1 inch. Quartz is essentially transparent to UV. This tube allows the solution of chlorite to 'see' the UV without the corrosive chlorite coming into contact with the actual lamp, which operates at elevated temperatures.

Regarding the annular space and air sparge: An experimental design was set up where the lamp, quartz housing and the chlorite solution were held constant except for the annular space between the quartz housing surrounding the lamp and the PVC shroud surrounding the quartz housing, and the air sparge rate. The results were surprising. The following plot shows that there is an optimum annular space. The optimum annular space is described in the graph of FIG. 10.

The invention contemplates optimization of the delivery of chlorine dioxide. The inventor has found that the optimum distance between the quartz housing and the circulation tub is a quarter of an inch and that the optimum air sparge rate is ten (10) standard cubic feet per hour (SCFH). This optimization of results is depicted in the graph FIG. 10. As noted that with the diameter of the quartz tube being one inch and with the inside diameter of the PVC circulation tube being one and a half inches, the delivery of chlorine dioxide is greatest. That is a quarter of an inch distance between the quartz housing and the circulation tube.

In the tests performed the dimensions of the PVC circulation tube and its relationship to the quartz tube (producing the annular space) were as follows:

The quartz tube housing diameter was one inch.

The inside dimensions of the PVC circulation tube (the outer dimensions don't matter) were as follows:

For the 1⅜" PVC tube, inside dimensions are 1.33+0.5

For the 1.5" PVC tube, inside dimensions are 1.55+05.

For the 2" PVC tube, inside dimensions are 2.00+0.06.

The annular space for each is shown below:

For the 1⅜" tube, annular space is 0.1875".

For the 1.5" tube, annular space is 0.25".

For the 2" tube, annular space is 0.5".

There is also an optimum air sparge rate. The optimum air sparge rate is 10–15 SCFH. In this region, the $ClO_2$ generation is optimized. See graph in FIG. 10.

The size of vessel containing the chlorite solution is not relevant. The important items are air sparge, the annular space and pH of the chlorite solution.

A number of experiments were done testing various buffers to try and keep the pH of the chlorite down. Initially, the $ClO_2$ output more than tripled, but within a short time, the system had reequilibrated to the normal operating pH, and the output dropped to more routine levels.

The circulation tube is very important. FIG. 11 shows the generation curve with no circulation tube in place. It shows that the $ClO_2$ generation is not constant but tails off with time. From this one can easily see that it would be very difficult to predict the $ClO_2$ generated at a given time.

FIG. 12 shows the effect of having a circulation tube to direct the air sparge which sweeps the solution of $ClO_2$. It is seen that $ClO_2$ concentration remains relatively constant over the life of the chlorite used in the generation process. This allows us to predict the output of the system, which is independent of chlorite concentration.

Early work was done with 10% chlorite, for no other reason than it was convenient. The $ClO_2$ production was independent of concentration, until the last few hours of the life of the chlorite solution. The reason for this is that the generation chemistry is UV limited. Chlorite has a very strong absorbance at 254 nm. Absorbance of 25%, 10%, 5% and 1% chlorite solutions all have absorbance values of about 3.6 absorbance units at 254 nm. (25% solution, for example, would be 250,000 ppm.) This means essentially all of the UV light at 254 is being absorbed. So the UV does not get very far beyond the quartz tube, i.e., the reaction is occurring right at the lamp wall. So, we don't see much in the way of fall-off of generation until we are at a few hundred ppm of chlorite. From 25%, of 250,000 ppm down to a few hundred ppm.

The net result of this is that we don't really have to concern ourselves about the solution strength. Just put in some chlorite, dilute it, and no matter what the pH is, it will rapidly equilibrate upward where it will stabilize and the $ClO_2$ output will become constant.

$ClO_2$ is produced inside the container, and the air sparge sweeps it from solution to a point of use. $ClO_2$ is a gas, and remains a gas in solution. It does not react to any significant degree with the water. Thus, it is relatively easy to remove. Irradiation of chlorite produces $ClO_2$, chlorine, chlorate and chloride. Of these, $ClO_2$ is the only one swept from solution by the air. At the pHs of the solution, i.e., >10, the chlorine is present as OCl (hypochlorite), which is ionic and will not be swept from solution by an air sparge.

Many advantages accrue from the use of the chlorine dioxide generator of this invention.

1. The ultraviolet generator is compact and convenient to change from one chlorite solution to another when the chlorite is dissipated.
2. Based on the circulation tube and sparge arrangement, the chlorine dioxide gas is constantly removed and thus not allowing chlorine gas build-up.
3. The generator is able to generate chlorine gas at a constant rate over a long period of time.
4. The generator is easy to make of parts which are already available on the market.

Although the invention has been described in terms of certain preferred embodiments, it will be apparent to those of ordinary skill in the art that modifications and improvements can be made to the inventive concepts herein without departing from the scope of the invention. The embodiments shown herein are merely illustrative of the inventive concepts and should not be interpreted as limiting the scope of the invention.

What is claimed is:

1. A chlorine dioxide generator for use with a container holding aqueous chlorite, comprising:
    a container having a cap;
    a lamp for generating radiation;
    a circulation tube proximate said lamp for circulating the aqueous chlorite so that said lamp can irradiate aqueous chlorite within said circulation tube to create chlorine dioxide; and
    a discharge port, in communication with the chlorine dioxide created within said circulation tube, for permitting the withdrawal of the chlorine dioxide from the container.

2. The chlorine dioxide generator of claim 1 wherein a quartz housing surrounds said lamp.

3. A chlorine dioxide generator as recited in claim 1, further comprising a shield outside of and proximate to said circulation tube for impeding contact between the lamp radiation and aqueous chlorite outside of said circulation tube.

4. A chlorine dioxide generator as recited in claim 1, wherein said lamp is cylindrical, wherein said circulation tube is substantially shaped as a cylinder coaxial with said lamp, and wherein aqueous chlorite is circulated in the space between said lamp and said circulation tube.

5. A chlorine dioxide generator as recited in claim 1, further comprising a plurality of circulation tubes proximate to said lamp for circulating aqueous chlorite into contact with said lamp radiation.

6. A chlorine dioxide generator as recited in claim 1, further comprising a gas sparge line attached to said cap for transporting the chlorine dioxide toward said discharge port.

7. The chlorine dioxide generator of claim 1 wherein there is a gas sparge line disposed between the lamp and the circulation tube to produce bubbles facilitating the exit of chlorine dioxide through the discharge port.

8. A chlorine dioxide generator as recited in claim 1, further comprising a vacuum attached to said discharge port for removing chlorine dioxide gas from the container.

9. A chlorine dioxide generator as recited in claim 1, further comprising a control module engaged with said lamp for controlling the generation of chlorine dioxide.

10. A chlorine dioxide generator for use with a container holding aqueous chlorite, comprising:
    a container having a cap;
    a lamp for generating radiation;
    a circulation tube proximate to said lamp and having apertures and an annulus at opposite ends of said tube for permitting circulation of the aqueous chlorite through a circulation space defined by said tube and said lamp, wherein said lamp irradiates the aqueous chlorite within said circulation space to create chlorine dioxide;
    an intake port and a discharge port in communication with the chlorine dioxide for permitting the withdrawal of the chlorine dioxide from the container.

11. A chlorine dioxide generator as recited in claim 10, wherein said lamp is substantially cylindrical, wherein said circulation tube is substantially shaped as a cylinder coaxial with said lamp, and wherein said circulation space is defined as the space between said lamp and said circulation tube.

12. A chlorine dioxide generator as recited in claim 10, further comprising a gas sparge line attached to said cap for facilitating the transport of the chlorine dioxide toward said discharge port.

13. A chlorine dioxide generator as recited in claim 10, wherein there is a shield attached external to said circulation tube.

14. A chlorine dioxide generator as recited in claim 10, wherein said lamp generates ultraviolet radiation and is surrounded by a quartz housing.

15. A chlorine dioxide generator as recited in claim 10, further comprising an eductor for removing chlorine dioxide through said discharge port.

16. A chlorine dioxide generator as recited in claim 10, further comprising a control module for detecting the quantity of chlorine dioxide generated by said lamp and for modifying the operation of said lamp to change the quantity of chlorine dioxide generated.

17. A chlorine dioxide generator for use with a container holding aqueous chlorite comprising:
    a container having a cap;
    a U.V. lamp for generating radiation;
    a circulation tube disposed with apertures proximate said U.V. lamp for circulating the aqueous chlorite so that said U.V. lamp can irradiate aqueous chlorite within said circulation tube to create chlorine dioxide;
    an aspirator and sparge line between said circulation tube and U.V. lamp;
    a discharge port, in communication with the chlorine dioxide created within said circulation tube, for permitting the withdrawal of the chlorine dioxide from the container.

18. The chlorine generator of claim 17 wherein a quartz housing surrounds said lamp.

19. The chlorine dioxide generator of claim 18 wherein the distance from the quartz housing to the circulation tube is a quarter of an inch.

* * * * *

UNITED STATES PATENT AND TRADEMARK OFFICE
CERTIFICATE OF CORRECTION

PATENT NO. : 6,171,558 B1
DATED : January 9, 2001
INVENTOR(S) : Simpson

Page 1 of 1

It is certified that error appears in the above-identified patent and that said Letters Patent is hereby corrected as shown below:

Claims 1 and 10,
Line 4, of each claim, change to read:

-- a lamp for generating radiation positioned within the container wherein the top part of said lamp is attached to the cap of said container; --.

Claim 17,
Line 4, change to read:

-- a U.V. lamp for generating radiation positioned within the container wherein the top part of said lamp is attached to the cap of said container;++3
521 --.

Signed and Sealed this

Twenty-sixth Day of February, 2002

*Attest:*

*Attesting Officer*

JAMES E. ROGAN
*Director of the United States Patent and Trademark Office*

UNITED STATES PATENT AND TRADEMARK OFFICE
CERTIFICATE OF CORRECTION

PATENT NO. : 6,171,558 B1  
DATED : January 9, 2001  
INVENTOR(S) : Simpson

It is certified that error appears in the above-identified patent and that said Letters Patent is hereby corrected as shown below:

<u>Claims 1 and 10,</u>
Line 4, of each claim, change to read:

-- a lamp for generating radiation positioned within the container wherein the top part of said lamp is attached to the cap of said container; --.

<u>Claim 17,</u>
Line 4, change to read:

-- a U.V. lamp for generating radiation positioned within the container wherein the top part of said lamp is attached to the cap of said container; --.

This certificate supersedes Certificate of Correction issued February 26, 2002

Signed and Sealed this

Fourth Day of June, 2002

*Attest:*

*Attesting Officer*

JAMES E. ROGAN
*Director of the United States Patent and Trademark Office*